United States Patent [19]

Fultz

[11] 4,393,306

[45] Jul. 12, 1983

[54] RADIATION DETECTOR

[75] Inventor: Brent T. Fultz, Berkeley, Calif.

[73] Assignee: The United States of America as represented by the United States Department of Energy, Washington, D.C.

[21] Appl. No.: 213,276

[22] Filed: Dec. 5, 1980

[51] Int. Cl.[3] .......... G01T 1/18; H01J 47/00

[52] U.S. Cl. .......... 250/374; 313/93

[58] Field of Search .......... 250/374, 375, 385; 313/93, 102, 214

[56] References Cited

U.S. PATENT DOCUMENTS

| | | | |
|---|---|---|---|
| 2,944,176 | 7/1960 | Anton | 313/93 |
| 3,011,060 | 11/1961 | Dorenbosch et al. | |
| 3,488,501 | 1/1970 | Poubeau | 313/93 |
| 4,289,967 | 9/1981 | Hanson et al. | 250/385 |

OTHER PUBLICATIONS

Keisch, "Detector for Efficient Backscatter Mossbauer Effect Spectroscopy", Nuclear Inst. & Methods 104(1972) 237-240.

*Primary Examiner*—Alfred E. Smith
*Assistant Examiner*—Janice A. Howell

[57] ABSTRACT

Apparatus is provided for detecting radiation such as gamma rays and X-rays generated in backscatter Mössbauer effect spectroscopy and X-ray spectrometry, which has a large "window" for detecting radiation emanating over a wide solid angle from a specimen and which generates substantially the same output pulse height for monoenergetic radiation that passes through any portion of the detection chamber. The apparatus includes a substantially toroidal chamber with conductive walls forming a cathode, and a wire anode extending in a circle within the chamber with the anode lying closer to the inner side of the toroid which has the least diameter than to the outer side. The placement of the anode produces an electric field, in a region close to the anode, which has substantially the same gradient in all directions extending radially from the anode, so that the number of avalanche electrons generated by ionizing radiation is independent of the path of the radiation through the chamber.

6 Claims, 4 Drawing Figures

FIG. 1
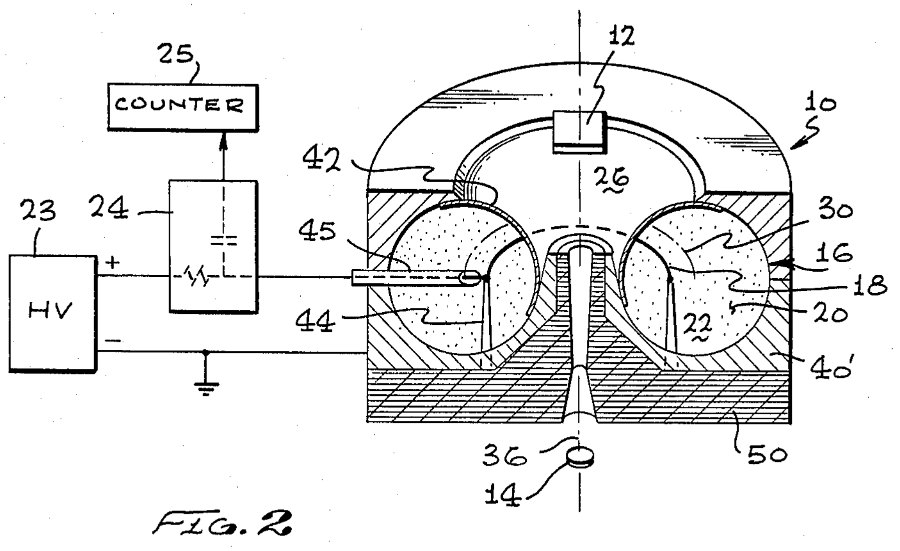
FIG. 2
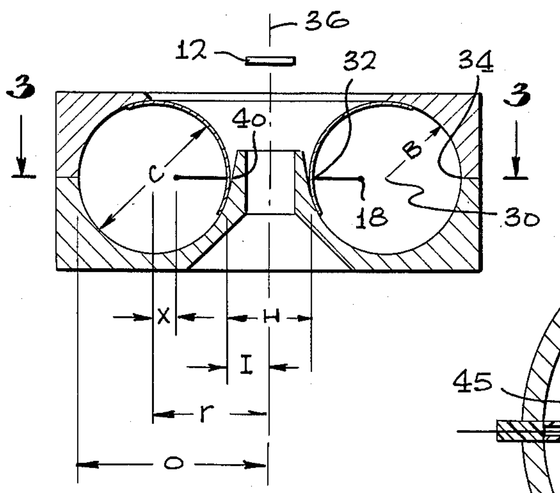
FIG. 3
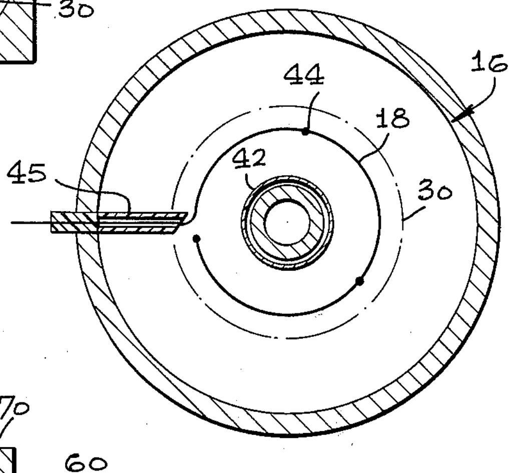
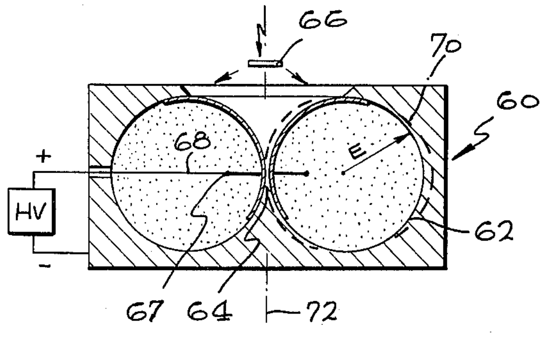
FIG. 4

RADIATION DETECTOR

ORIGIN OF THE INVENTION

The Government of the United States of America has rights in this invention pursuant to Department of Energy Contract No. W-7405-ENG-48.

BACKGROUND OF THE INVENTION

A radiation detector of the gas-filled proportional counter type, includes a cathode and anode and a gas lying between them. A radiator particle such as a photon of X-ray or gamma ray radiation entering the chamber, ionizes gas atoms, with the number of ionizations being proportional to the photon energy. The electrons formed in this process are accelerated towards the anode. When the electrons gain sufficient kinetic energy they too will ionize gas atoms and start an ionization avalanche in the strong electric field near the thin wire anode. The net number of electrons which reach the anode wire (and hence the charge) can be closely proportional to the photon energy. The number of electrons generated by a photon of a particular energy depends upon the electric field in the avalanche region that extends within a few tens of microns around the anode. In order for the same number of avalanche electrons to be generated for a photon of given energy passing through any region of the chamber that lies between the cathode and anode, it is important that the electric field gradient be the same in every direction extending radial to the wire anode in the small avalanche region around the anode.

A uniform electric field gradient around a wire anode of a radiation detector, can be achieved by utilizing a wire anode that extends along the axis of a cylindrical cathode that surrounds the wire. Gas filled proportional counters of this construction are utilized as standard devices for measuring radiation intensity, such as in Mössbauer scattering of a gamma ray beam transmitted through a thin foil specimen. However, the simple cylindrical coaxial radiation detector design cannot be easily utilized in certain applications such as in detecting backscattered radiation wherein the radiation source must be located in approximately the same direction from the specimen as is the detector.

A detector design useful in backscatter radiation detection, employs a toroidal detector. Radiation can pass from the source through the hole in the torus to the sample, and the backscattered radiation can be detected over a wide solid angle by the toroidal detector. A detector of this general configuration is shown, for example, in U.S. Pat. No. 3,011,060 by Dorembosch et al. wherein a thin wire anode extends along the minor axis of the torus and the cathode forms the walls of the torus. However, a simple detector of this configuration produces an output that is dependent upon the particular location within the torus through which the radiation passes, and therefore is not a high resolution proportional counter. An attempt has been made to avoid the non-uniformity of the electric field gradient immediately surrounding the anode, by surrounding the anode wire with a biased cylindrical grid. While such a grid can improve the performance of the detector to a level nearly compatable to that of a cylindrical proportional counter, it requires careful alignment of the grid with respect to the anode, which results in a delicate and costly detector. A wide angle proportional counter with good resolution and which provided a hole around the detection region to enable backscatter radiation detection, and which was of relatively simple and rugged design, would be of considerable value in radiation detection, as in back scatter Mössbauer effect spectroscopy.

OBJECTS AND SUMMARY OF THE INVENTION

One object of the present invention is to provide a wide angle radiation detector of the proportional counter type, which produces substantially the same output for photons of the same energy that pass through different regions of the detector chamber.

Another object of the invention is to provide a proportional counter for use in backscatter radiation detection, such as in backscatter Mössbauer effect spectroscopy.

Another object is to provide a radiation detector of the type which utilizes a thin anode lying within a substantially toroidal cathode, and with a large potential difference established between them, which maintains a closely uniform electric field gradient in all directions radial to the anode in a region immediately surrounding the anode.

In accordance with one embodiment of the present invention, a radiation detector is provided which has a large "window" through which radiation can be detected, and which generates an output of a magnitude largely independent of the location in the detector which receives the radiation. The apparatus includes a largely toroidal cathode, a small diameter anode extending in substantially a circle within the toroidal cathode, a quantity of gas lying in the region between the cathode and anode, and a means for establishing an electrical potential between the cathode and anode. The anode is positioned so it lies closer to the radially inner side of the toroidal cathode than the radially outer side thereof, to establish an electrical field gradient immediately around the anode which is substantially uniform in all directions extending radially from the anode. The toroidal cathode can be of a "fat" configuration wherein the hole at the center of the toroid has a diameter less than twice the diameter of the cross section of the toroid, to intercept a large portion of the radiation from a sample lying along the major axis of the toroid and near one face of it. The anode is offset from the circular minor axis of the toroid by more than ten percent of the diameter of the toroidal chamber formed by the cathode.

The novel features of the invention are set forth with particularity in the appended claims. The invention will best be understood from the following description when read in conjunction with the accompanying drawings.

BRIEF DESCRIPTION OF THE DRAWINGS

FIG. 1 is a sectional perspective view of an ionization detector constructed in accordance with one embodiment of the invention.

FIG. 2 is a sectional view of the detector of FIG. 1.

FIG. 3 is a view taken on the line 3—3 of FIG. 2.

FIG. 4 is a sectional view of an ionization detector constructed in accordance with another embodiment of the invention.

DESCRIPTION OF THE PREFERRED EMBODIMENTS

FIG. 1 illustrates a radiation detector 10, showing it utilized to detect X-rays and gamma rays backscattered from a specimen 12 that is irradiated by gamma rays from a radiation source 14. This general technique of backscatter Mössbauer spectrometry is well known for analyzing a sample, as to determine the amount or chemical environment of the isotope $Fe^{57}$ by exposing the sample to radiation from the source 14 which may consist of cobalt 57 diffused into palladium. Gamma rays of a very well defined energy of 14.41 keV are emitted by $Fe^{57}$ atoms in the sample, and these gamma rays can be detected by the ionization detector 10. The sample 12 will also emit an even larger number of X-rays of 6.3 keV energy due to X-ray fluorescence of iron atoms in the sample. The detector 10 can detect each type of photon and generate an output pulse of an amplitude accurately proportional to the photon energy to enable an analysis to be made of the sample.

The ionization detector 10 includes a cathode 16 of toroidal shape and a small diameter wire anode 18 lying within the toroidal cathode. In general, the cross-sectional diameter of the anode should be less than one-hundreth the cross-sectional diameter of the cathode. The cathode forms a closed chamber, and a quantity of gas 20 lies in the region 22 between the anode and cathode. Although the chamber is substantially closed, inexpensive fill gases may be flowed continuously through the detector at a slow rate during operation to circumvent problems due to small leaks in the cathode wall. A high voltage supply 23 is connected between the cathode and anode to apply a large potential between them. A charge sensitive preamplifier 24 is also connected to the anode to provide a voltage pulse when each electron strikes the anode and this voltage pulse is delivered to a counter 25. The cathode 16 has thin walls along a window region 26 which faces the specimen 12, to readily admit radiation of even relatively low energy into the chamber.

When a photon from the sample 12 passes through the window 26 into the gas-filled chamber 22, the photon ionizes some of the gas atoms. The number of such ionizations is proportional to the energy of the photon, and the resulting electrons drift towards the small diameter anode 18. When these electrons gain sufficient kinetic energy during travel along a mean free path, they ionize gas atoms, and start an ionization avalanche in the strong electric field that lies near the anode 18. The number of electrons which reach the anode (and which represent the integral of the current over a short period representing one photon detection, and which can be counted by the high speed counter located after the preamplifier 24) can be closely proportional to the energy of the photon which passed through the chamber. Since the number of avalanche electrons generated is determined by the electric field profile in the avalanche region around the anode 18, it is important that the electric field gradient extending radially from the anode be substantially constant in all radial directions near the anode. Otherwise, photons of the same energy which pass through different portions of the chamber would produce different numbers of avalanche electrons for detection by the circuit 24. The ability of the detector to distinguish between photons of a very well defined energy such as of 14.41 keV energy representing Mössbauer absorptions of $Fe^{57}$, and background radiation photons of slightly different energy, is of great importance in enabling accurate sample analysis. Accordingly, it is important to assure that the electric field gradient immediately about the anode 18 is uniform in all radial directions from the anode.

In accordance with the present invention, the thin wire anode 18 is located so it does not extend along the minor axis 30 of the toroidal cathode 16, but instead is positioned so it lies closer to the radially inner side 32 (FIG. 2) of the toroidal cathode than to the radially outer side 34. That is, the anode 18 is spaced a distance X from the center 30 of the cross section of the toroidal chamber, on a side of the center 30 which is closest to the major axis 36 of the toroidal cathode. This spacing X accounts for the fact that the inside surface area of the radially outer half of the cathode (which extends 90° on either side of point 34) is much larger than the inside surface area of the radially inner part of the cathode (which extends 90° on either side of point 32) which lies within the radius r of the minor toroid axis. If the toroidal cathode were "thin", which would be the case if a very long but thin cylinder were bent into a large diameter circle, then an anode could be placed along the axis of the bent cylinder and produce a substantially uniform electric field gradient. However, if a "fat" toroid is utilized, wherein the inside and outside radii I and O of the toroid are very different, then an anode located along the minor axis 30 of the toroid will not produce a uniform electric field gradient. Such a "fat" toroid is necessary to intercept radiation emitted in a large solid angle from the specimen 12. The applicant has found that the positioning of the wire anode 18 closer to the inside radius I of the toroidal cathode can offset the reduced inside surface of the inner half of the toroidal cathode in the case of a "fat" toroid, to produce a substantially uniform electric field gradient immediately about the anode 18, to thereby enable the detector to produce an output pulse of a magnitude which is substantially independent of the particular location in the chamber through which a photon passes.

The particular amount X by which the anode location 18 must be offset from the secondary axis 30 of the torus, can be determined by mathematical electrostatic analysis or empirically. In one detector that has been constructed, which had a chamber radius B of one inch (25.4 mm) or a chamber diameter of two inches, a torus hole 40 along the main torus axis 36 of a diameter H of 1.1 inches (28 mm), and a tungsten anode 18 of 2 mil (thousandths of an inch) diameter, tests were conducted to determine the optimum offsetting distance X of the anode from the minor torus axis 30. This was accomplished by directing a collimated gamma-ray beam of known energy into different parts of the detector chamber 22 and observing the uniformity of the output pulses. It was found that the greatest uniformity was achieved with an offset X of seven millimeters, which is about 15% of the diameter C of the cross-section of the chamber.

The above-described detector, which is illustrated in FIGS. 1–3, was constructed by machining most of the toroidal cathode 16 out of two disks of 6061-T6 aluminum using a lathe with a radius cutter to produce a toroid of circular cross section. One ring 40′ extended 180° about the cross section of the torus while the other ring covered an additional 90° to provide a radiation entrance window 26 that occupied the other 90°. The window 26 was covered by a sheet 42 formed of aluminum foil mounted to the aluminum block 40. The tungsten anode 18 was found to have sufficient stiffness to require only three small plexiglass stand-off insulators 44 to hold it in position as a ring inside the detector chamber. A tubular insulator 45 was used to surround the lead-in wire and the anode, as well as to prevent the lead in wire from forming as effective part of the anode. The chamber was filled with gas 20 of 45% krypton, 45% argon, and 10% methane, at atmospheric pressure. It is expected that better pulse height resolution would be possible at higher (e.g. two atmospheres) gas pressures due to a smaller avalanche region around the anode. A radiation shield 50 was provided to shield the chamber 22 from gamma rays that would otherwise travel directly from the source 14 through the chamber. The shield 50 was formed of multiple layers of heavy elements including lead, tantalum and tungsten, and it would appear desirable to also utilize layers of thoria. When the detector was utilized to detect backscattered gamma rays in M/össbauer effect spectroscopy, using a radiation source 14 of $Co^{57}$ and a specimen 12 having abundant $Fe^{57}$, it was found that the detector provided an energy resolution of 13% to 14% for 14.41 keV gamma rays, which is only slightly worse than that of the best cylindrical proportional counters (which are useful in transmission detection but not as useful in backscatter detection).

While the toroidal ionization detector is especially useful in detecting backscattered radiation, since it provides a hole through which incident radiation can reach a sample and provides a large solid angle window to detect backscattered radiation, the detector is also useful in detecting transmission radiation or radiation from other sources where a compact detector is useful. FIG. 4 illustrates a detector 60 constructed in accordance with another embodiment of the invention, wherein the cathode 62 is constructed of a very "fat" torus having a central hole 64 of almost zero diameter, compared with the radius E of the cross-section of the torus. The provision of substantially no torus hole, results in the detection of radiation from a source 66 over a large solid angle without increasing the overall size of the detector. In this case, the anode 67 is offset from the secondary axis 68 of the torus by a greater proportion than in the somewhat "thinner" torus of FIGS. 1-3. The offsetting of the anode 67 from the secondary torus axis 68 can be reduced somewhat by altering the cross section of the torus, as to the configuration shown at 70 which provides a greater radius of curvature near the main axis 72 of the toroid and a somewhat smaller radius of curvature furthest from the main axis.

Thus, the invention provides a radiation detector of largely toroidal configuration, to enable its use in detecting back scattered radiation that is initially transmitted through the hole in the torus, as well as to provide a compact wide angle detector even in other applications, which produces substantially the same output pulse height for photons of the same energy passing through different portions of the region between the cathode and anode. This is accomplished by mounting the anode so it lies off the center of the cross section of the torus in a direction towards the major axis of the torus. For a torus of circular cross section, the anode is displaced from the minor axis of the torus in a direction towards the radially inner side and away from the radially outer side of the torus. For a toroidal chamber having a central hole along the center of the toroid which has a diameter less than twice the diameter of the cross section of the toroidal chamber, the anode is offset from the minor axis of the toroid by more than 10% of the diameter of the cross section of the toroidal chamber.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. Apparatus for detecting ionizing radiation comprising:
   a cathode which includes electrically conductive walls forming an annular chamber with a radially inner side and a radially outer side;
   an anode extending in substantially a circle within said chamber;
   a quantity of gas lying in said chamber; and
   means for establishing an electrical potential between said cathode and anode;
   said anode positioned so it lies closer to the radially inner side than the radially outer side of the cathode chamber.

2. The apparatus described in claim 1 wherein:
   said annular chamber is of a substantially toroidal shape with a largely circular cross-section, and with the diameter of any hole through the center of the toroid along the major axis of the toroid, being less than twice the diameter of the cross-section of the chamber; and
   said anode is offset from the minor axis of the toroid by at least about ten percent of the diameter of the cross-section of the chamber.

3. The apparatus described in claim 2 wherein:
   said annular chamber has a cross-sectional diameter approximately equal to twice the diameter of the hole extending along the major axis of the toroid, and said anode is offset by about 15% of the cross-sectional diameter of the cross-section of the chamber.

4. In an apparatus for detecting ionizing radiation which includes a cathode substantially in the form of a torus, and an anode extending in substantially a circle within the torus, the improvement wherein:
   said anode is spaced from the center of the cross-section of said substantially toroidal cathode, on a side of the center closest to the major axis of the toroid.

5. The improvement described in claim 4 wherein:
   said substantially toroidal cathode has an outer side of a radius O, as measured from the major axis of the toroid, which is at least twice as great as the radius I of the inner side of the toroid as measured from the major axis, said anode is in the form of a wire having a cross-sectional diameter less than one-hundredth the cross-sectional diameter of said substantially toroidal cathode, and said anode is spaced from said center of the cross-section of said cathode by at least 10% of the cross-sectional diameter of said cathode.

6. A detector useful in backscatter Mossbauer effect spectroscopy, comprising:
   walls forming an annular chamber with electrically conductive walls forming a cathode, said walls forming a hole extending through the major axis of the chamber;
   a quantity of gas lying in said chamber;
   a wire-like anode extending in a circle within said chamber;

means for applying an electrical potential between said anode and cathode and for detecting current flow between them; and a radiation shield extending over one face of said chamber and at least partially through said hole in the middle of said chamber, said shield having a hole extending along the major axis of the annular chamber to pass radiation;

said anode extending in a circle whose axis is coincident with the major axis of said annular chamber, but said circle having a radius less than the radius from said major axis to the center of the cross-section of said annular chamber.

* * * * *